United States Patent [19]

Burgdorf et al.

[11] 4,220,375
[45] Sep. 2, 1980

[54] BRAKING PRESSURE CONTROL UNIT

[75] Inventors: Jochen Burgdorf, Offenbach; Hans-Henning Luepertz, Darmstadt, both of Fed. Rep. of Germany

[73] Assignee: ITT Industries, Inc., New York, N.Y.

[21] Appl. No.: 20,001

[22] Filed: Mar. 12, 1979

[30] Foreign Application Priority Data

Apr. 4, 1978 [DE] Fed. Rep. of Germany ........ 2814394
May 12, 1978 [DE] Fed. Rep. of Germany ........ 2820768

[51] Int. Cl.² .............................................. B60T 8/26
[52] U.S. Cl. ................................. 303/6 C; 303/24 A; 303/24 C; 303/24 F
[58] Field of Search ................. 303/24 C, 24 F, 24 R, 303/24 A, 6 C, 6 A, 22 R, 22 A; 188/195, 349

[56] References Cited
U.S. PATENT DOCUMENTS 4,071,281  1/1978  Tomoyuki ..................... 303/24 A

FOREIGN PATENT DOCUMENTS 2236294  2/1974  Fed. Rep. of Germany .
2265106  4/1976  Fed. Rep. of Germany .

*Primary Examiner*—Douglas C. Butler
*Attorney, Agent, or Firm*—John T. O'Halloran; Alfred C. Hill

[57] ABSTRACT

A brake pressure control unit for a vehicle hydraulic brake system having two separate brake circuits to control brakes at the rear wheel of the vehicle comprising a first valve to control one of the two brake circuits, a second valve to control the other of the two brake circuits, each of the first and second valves being disposed between an inlet chamber connected to a fluid pressure source and an outlet chamber connected to a different one of the two brake circuits, a movable partition wall disposed intermediate the two brake circuits and controlling the first and second valves, a by-pass conduit by-passing one of the first and second valves, and a deceleration-responsive valve disposed in the by-pass conduit.

13 Claims, 3 Drawing Figures

4,220,375

BRAKING PRESSURE CONTROL UNIT

BACKGROUND OF THE INVENTION

The present invention relates to a vehicle hydraulic brake system having the brakes at the vehicle rear wheels controlled by two separate brake circuits and more particularly to a braking pressure control unit for such a brake system.

From German printed patent application DE-AS No. 2,265,106 a braking pressure control unit is known in which the vehicle rear wheels are controlled by two separate brake circuits. The control unit includes two pressure-fluid valves arranged in tandem, each valve controlling the fluid connection between a fluid source and a wheel-brake cylinder of a different one of the two brake circuits. The first valve is designed as a pressure-reducing valve including an axially slidable stepped piston having acting on it a control force introduced from outside. The smaller area of the stepped piston is acted upon by the pressure from the fluid source, and its larger area is acted upon by the pressure supplied to the subsequent wheel brakes in opposition to the control force. The second valve is a pressure-limiting valve whose closure member is arranged in an axially movable second piston and bears against the regulator housing through a tappet. The closure member of the first valve bears upon the side of the second piston adjacent the stepped piston through a tappet.

From German Pat. No. 2,236,294 a braking pressure control unit is known which is suitable for a vehicle hydraulic brake system in which the vehicle rear wheels are controlled by two separate brake circuits. The braking pressure control unit comprises a pressure-reducing valve, a pressure-limiting valve and a movable partition wall disposed between the valves preferably in the form of a piston, with both of the valves' closure members bearing upon the wall's front faces by means of tappets. A load-dependent control force which influences the magnitude of the change-over pressure acts on the pressure-reducing valve.

So long as both brake circuits of the vehicle braking system are intact, both valves operate as pressure-reducing valves whose change-over point is responsive to pressure and variable by a load-dependent control force. In the event of failure of the brake circuit controlled by the pressure-reducing valve, the pressure-limiting valve acts as a pressure limiter. The change-over point of this pressure-limiting valve is attained at relatively low pressures because the piston forming the partition wall is only required to be displaced by the amount of closing travel of the pressure-limiting valve in opposition to the control force, until the pressure-limiting valve is closed. If both circuits are intact, the piston of the pressure-reducing valve is required to be displaced by the sum of the closing travels of both valves, as a result of which the change-over point of both valves is attained at a higher pressure. By virtue of the fact that, in the event of failure of the brake circuit controlled by the pressure-reducing valve, the building up of pressure in the intact brake circuit is limited at a very early point of time, there results a low braking effect at the associated brake. It is, however, essential in the event of failure of one brake circuit that the best possible braking effect be obtained with the still intact brake circuit. Therefore, a reduction of the braking effect is far from being desirable in that case.

A disadvantageous effect also occurs when there is a low coefficient of friction between tire and road surface. In such a situation the braking pressure control unit switches too rapidly because of the rapidly developed pressure and the wheel cylinders of the vehicle rear wheels are acted upon by reduced brake pressure too early.

SUMMARY OF THE INVENTION

It is, therefore, an object of the present invention to provide a braking pressure control unit of the type referred to hereinabove which avoids the shortcomings of prior-art devices and in which there occurs practically no pressure difference in the two wheel-cylinder brake circuits.

A feature of the present invention is the provision of a braking pressure control unit for a vehicle hydraulic brake system having two separate brake circuits to control brakes at the rear wheels of the vehicle comprising: a housing; a first inlet chamber disposed in the housing coupled to a first fluid pressure source; a second inlet chamber disposed in the housing spaced longitudinally from the first inlet chamber coupled to a second fluid source; a first outlet chamber disposed in the housing spaced from the first and second inlet chambers connected to one of the two brake circuits; a second outlet chamber disposed in the housing spaced from the first and second inlet chambers and the first outlet chamber connected to the other of the two brake circuits; a first valve disposed in the housing between the first inlet chamber and the first outlet chamber; a second valve disposed in the housing between the second inlet chamber and the second outlet chamber; a movable partition wall disposed in the housing intermediate the first and second outlet chambers controlling the first and second valves; a by-pass conduit disposed in the housing by-passing one of the first and second valves; and a deceleration-responsive valve disposed in the by-pass conduit.

The advantages of the braking pressure control unit of the present invention are:

(a) both brake circuits are controlled dependent on the pressure and on the vehicle deceleration;

(b) the same pressure prevails in both brake circuits;

(c) the control unit is of simple structure and can be manufactured at low costs; and (d) the control unit is of low weight and requires little space.

In accordance with a preferred improvement of the subject matter of this invention, the first valve is associated with a stepped piston and the by-pass conduit by-passes the second valve. From this there results a deceleration- and pressure-responsive braking pressure control unit for dual-circuit brake systems, allowing control of pressure in each brake circuit, with the two brake circuits mutually influencing each other. In the event of one brake circuit failing, the control function of the other brake circuit is maintained.

In a suitable embodiment of the subject matter of the present invention, one of the valves is disposed in the movable partition wall and includes a closure member bearing upon a wall of the housing by means of a tappet. This design affords the advantage of permitting particularly simple and low-cost machining of the bore accommodating the pistons from one side of the housing.

The valves and the partition wall are preferably coaxially arranged. This results in a low weight and low space requirements of the braking pressure control unit. Because of the simple design the by-pass conduit comprises a chamber including a fluid inlet opening and a fluid outlet opening as well as a first and a second line, with the first line providing for connection between the fluid inlet opening and the inlet chamber side, and the second line providing for connection between the fluid outlet opening and the outlet chamber side, of the associated valve. For a deceleration responsive valve, the fluid outlet opening is suitably provided with a valve seat and the chamber accommodates a ball which closes the fluid outlet opening when a specific vehicle deceleration is exceeded.

In another embodiment of the subject matter of the invention, the first and second valve are pressure-limiting valves. Such an arrangement permits limitation of the brake pressure in both brake circuits concurrently when a specific vehicle deceleration is attained. Moreover, this arrangement is of very simple design and subject to low frictional forces because of the small number of necessary seals.

In the event of the first and second valve being pressure-limiting valves, it will be suitable to design the partition wall in the form of two pistons, with a spring being positioned therebetween. In this arrangement, the spring serves as a control force for the braking pressure control unit, and the space between the pistons—provided it is pressurized by atmospheric pressure—creates a true dual-circuit system because, in the event of failure of one of the seals of a piston, the pressure can escape into atmosphere and the failure is noticed immediately. In another variant of the embodiment incorporating pressure-limiting valves, the first valve is positioned in a piston acted upon by a control spring, and the by-pass conduit by-passes the second valve. As a result of this arrangement, the control spring is located on one side of the braking pressure control unit and, because of its ease of access, can be acted upon by a load-responsive control force.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
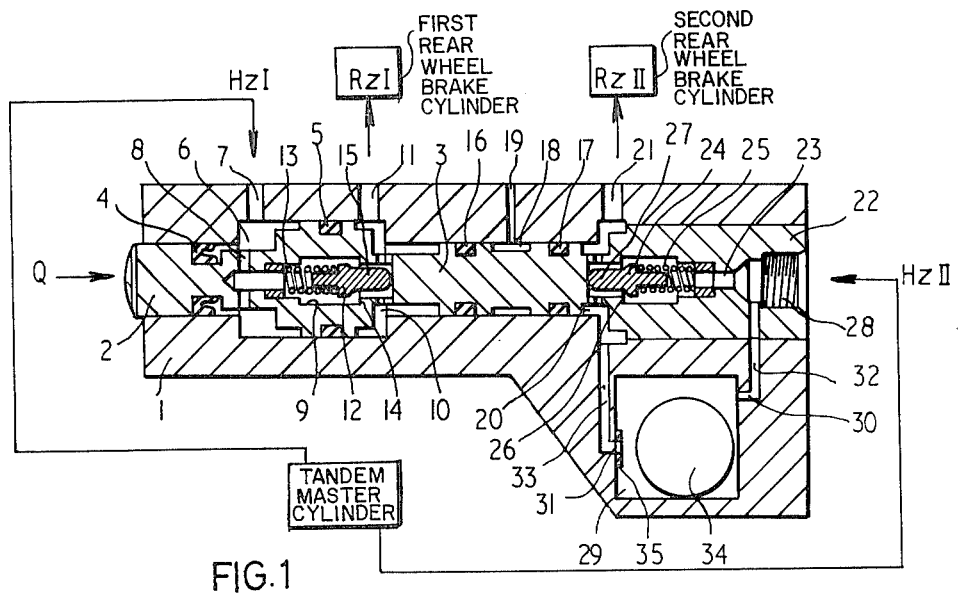
FIG. 1 is a longitudinal cross-sectional view of a first embodiment of a braking pressure control unit in accordance with the principles of the present invention which is controlled in response to load, deceleration and pressure.

Referring to FIG. 1 the first embodiment of the brake pressure control unit of the present invention includes a stepped piston 2 and a floating piston 3 which are axially movable in a housing 1 incorporating a stepped bore. Stepped piston 2 is sealed relative to the bore by means of seals 4 and 5. A port 7, to which a brake circuit Hz I of a master cylinder is connected, terminates into an inlet chamber 6 which is bounded by an annular surface of stepped piston 2. Inlet chamber 6 is connected with an outlet chamber 10 through a radial bore 8 and a coaxial fluid passageway 9 in the interior of stepped piston 2. Outlet chamber 10 is bounded by the front surface of the larger step of stepped piston 2 and is provided with a port 11 coupled to a wheel cylinder Rz I. Disposed in fluid passageway 9 is a valve closure member 12 which is urged against a valve seat 14 by a spring 13. Valve closure member 12 includes a tappet 15 extending out of stepped piston 2. Q identifies a control force which acts on stepped piston 2 in response to the axle load.

Floating piston 3 is sealed relative to the bore wall by means of two seals 16 and 17. Intermediate seals 16 and 17 is an annular chamber 18 which is pressurized to atmospheric pressure through a conduit 19. This measure serves to ensure that in the event of failure of any one of the two seals 16 or 17 the pressure is allowed to escape into atmosphere so that the failure may be noticed immediately. The end of floating piston 3 remote from stepped piston 2 forms a boundary of an outlet chamber 20 including a port 21 which is coupled to a wheel cylinder Rz II of a second brake circuit.

Another boundary of outlet chamber 20 is formed by a valve housing 22 including a fluid passageway 23 which accommodates a valve closure member 24. A spring 25 urges valve closure member 24 against a valve seat 26. A tappet 27 of valve closure member 24 extends out of housing 22 and abuts against a front end of floating piston 3. Fluid passageway 23 has on the inlet side a port 28 for connection to a second brake circuit Hz II of the master cylinder.

Housing 1 accommodates a chamber 29 with a fluid inlet opening 30 and a fluid outlet opening 31. Fluid inlet opening 30 is connected with port 28 through a first conduit 32 and fluid outlet opening 31 is connected with outlet chamber 20 through a second conduit 33. Chamber 29 houses a ball 34 and a sealing ring 35 which surrounds the fluid outlet opening 31 and serves as a valve seat for ball 34.

The mode of operation of the braking pressure control unit of FIG. 1 shall first be described for the case where both brake circuits are operable. In the normal position of the arrangement, stepped piston 2 is urged against floating piston 3 and the latter against valve housing 22 as a result of which closure members 12 and 24 of both valves are open. On actuation of the brake, the pressure fluid for both brake circuits is allowed to flow freely from port 7 to port 11 and from port 28 to port 21. At a specific pressure, stepped piston 2 moves in opposition to control force Q. Since at the same moment the pressure in outlet chamber 20 would preponderate, floating piston 3 initially follows stepped piston 2 until closure member 24 closes. If a specific vehicle deceleration is reached by that time, ball 34 rests against sealing ring 35, and fluid outlet opening 31 of chamber 29 is closed. Thus, when closure member 24 moves into abutment with valve seat 26, no further fluid is fed into outlet chamber 20, even if the pressure is increased on the inlet side. Floating piston 3 stops moving and, with the pressure continuing to increase, stepped piston 2 continues moving against control force Q and dissociates itself from floating piston 3, thereby causing closing of closure member 12. A reduced pressure is then supplied to the brake cylinders through outlets 11 and 21, respectively, with floating piston 3 providing for equal pressures in outlet chamber 20 and in outlet chamber 10.

However, in the event of the vehicle deceleration failing to reach the value at which ball 34 closes fluid outlet opening 31 the moment closure member 24 closes, pressure fluid continues being fed into outlet chamber 20 through first conduit 32, chamber 29 and second conduit 33, thus causing a pressure increase in outlet chamber 20. Since floating piston 3 provides for equal pressures in outlet chambers 10 and 20, closure member 12 remains open for the time being and will not close until after ball 34 closes fluid outlet opening 31 on attainment of a specific vehicle deceleration.

If the first brake circuit Hz I, Rz I fails as a result of a defect, the valve (closure member 24 and seat 26) associated with the second brake circuit Hz II, Rz II operates as a pressure-limiting valve. The valve 24, 26 normally closes at a relatively low pressure. This pressure would not, however, suffice to achieve a sufficient braking effect. By means of the by-pass conduit 32, 29, 33 by-passing the valve 24, 26, pressure fluid continues being fed into outlet chamber 20 until ball 34 closes fluid outlet opening 31 at a specific vehicle deceleration.

Conversely, if the second brake circuit Hz II, Rz II fails, stepped piston 2 continues to operate as a pressure-reducing valve. The change-over point of the valve (closure member 12 and seat 14) will, however, be reached at an earlier point of time than would be the case if both brake circuits were operable, because stepped piston 2 is only required to be displaced by the amount of the closing travel of its associated valve 12, 14, in order to close the valve 12, 14.

Figure 2:
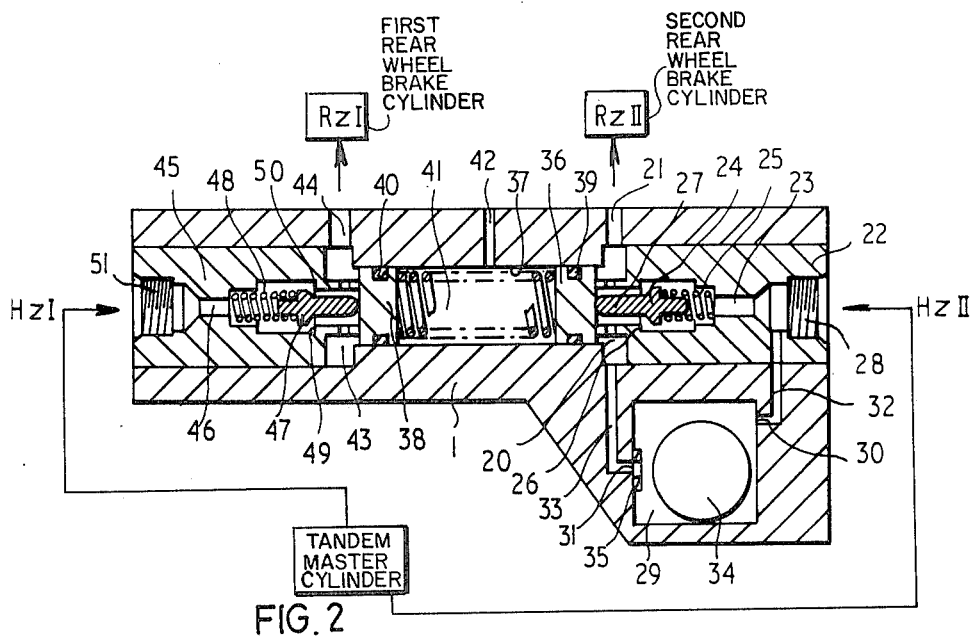
FIG. 2 is a longitudinal cross-sectional view of a second embodiment of a braking pressure control unit in accordance with the principles of the present invention which operates as a pressure limiter following the closing of the deceleration-responsive valve.

FIG. 2 shows the second embodiment of a braking pressure control unit of the present invention for a first brake circuit Hz I, Rz I and a second brake circuit Hz II, Rz II. The valve positioned in the second brake circuit and the by-pass conduit with the deceleration-responsive valve correspond to the arrangement of FIG. 1 and are thus assigned the same reference numerals. Valve housing 22 forms a boundary of outlet chamber 20 having a port 21 coupled to a wheel cylinder Rz II of the second brake circuit. Valve housing 22 includes fluid passageway 23 accommodating valve closure member 24. A spring 25 urges valve closure member 24 against valve seat 26. Valve closure member 24 includes tappet 27 extending out of valve housing 22. On the inlet side, fluid passageway 23 has a port 28 for connection to the second brake circuit Hz II of a master cylinder.

Housing 1 accommodates chamber 29 with fluid inlet opening 30 and fluid outlet opening 31. Fluid inlet opening 30 is connected to port 28 through first conduit 32 and fluid outlet opening 31 is connected to outlet chamber 20 through second conduit 33. Chamber 29 houses ball 34 and sealing ring 35 which surrounds fluid outlet opening 31 and serves as a valve seat for ball 34.

Another boundary of outlet chamber 20 is formed by a piston 36 which is connected with another piston 38 through a control spring 37. Pistons 36 and 38 are sealed relative to the bore wall by means of seals 39 and 40, respectively. Intermediate pistons 36 and 38 is a hollow space 41 accommodating control spring 37 and pressurized by atmospheric pressure through a bore 42. Piston 38 forms a boundary of an outlet chamber 43 including a port 44 coupled to a wheel cylinder Rz I of the first brake circuit.

Outlet chamber 43 is further bounded by a valve housing 45 including a fluid passageway 46 which accommodates a valve closure member 47. A spring 48 urges valve closure member 47 against a valve seat 49.

A tappet 50 of valve closure member 47 extends out of valve housing 45 and bears on piston 38. Fluid passageway 46 has on its inlet side a port 51 for connection to the first brake circuit Hz I of the master cylinder.

The mode of operation of the braking pressure control unit of FIG. 2 shall first be described for the case where both brake circuits are operable. In the normal position of the arrangement, pistons 36 and 38 are urged against the respective valve housings 22 and 45 by spring 37 as a result of which closure members 24 and 47 of both valves are open. On actuation of the brake, the pressure fluid for both brake circuits is allowed to flow freely from ports 28 and 51 to ports 21 and 44, respectively. The pressure in outlet chamber 20 acts on the front surface of piston 36 and the pressure in outlet chamber 43 acts on the front surface of piston 38. When the sum of each of the forces acting on the surfaces of pistons 36 and 38 close to the valves becomes greater than the force of control spring 37, pistons 36 and 38 move in opposition to their preload. As a result, closure members 24 and 47 of both valves close at the same time.

If a specific vehicle deceleration is reached by that time, ball 34 rests against sealing ring 35, and fluid outlet opening 31 of chamber 29 is closed. Thus, when closure member 24 and 47 move into abutment with their respective valve seats 26 and 49, no further fluid is fed to outlet chambers 20 and 43, even if the pressure is increased on the inlet side, i.e., the pressure in outlet chambers 20 and 43 is thereby limited.

However, in the event of the vehicle deceleration failing to reach the value at which ball 34 closes fluid outlet opening 31 the moment closure member 24 closes, pressure fluid continues being fed into outlet chamber 20 through first conduit 32, chamber 29 and second conduit 33, thus causing a pressure increase in outlet chamber 20. Since the piston-and-spring arrangement 36, 38, 37 provides for equal pressures in outlet chambers 20 and 43, closure member 47 remains open for the time being and will not close until after ball 34 closes fluid outlet opening 31 on attainment of a specific vehicle deceleration.

If the first brake circuit Hz I, Rz I fails as a result of a defect, the mode of operation of the valve (closure member 24 and seat 26) associated with the second brake circuit Hz II, Rz II and of the deceleration-responsive valve (ball 34 and ring 35) will remain unchanged. Since closure member 24 will close at a lower pressure, the braking pressure in the outlet chamber 20 will not be limited before ball 34 is in abutment with sealing ring 35, i.e., at a specific vehicle deceleration, due to the by-pass conduit 32, 29, 33.

In the event of failure of the second brake circuit Hz II, Rz II and operability of the first brake circuit Hz I, Rz I, the valve (closure member 47 and seat 49) associated with the first brake circuit acts as a simple pressure limiter whose change-over point is dependent on the prevailing pressure.

Figure 3:
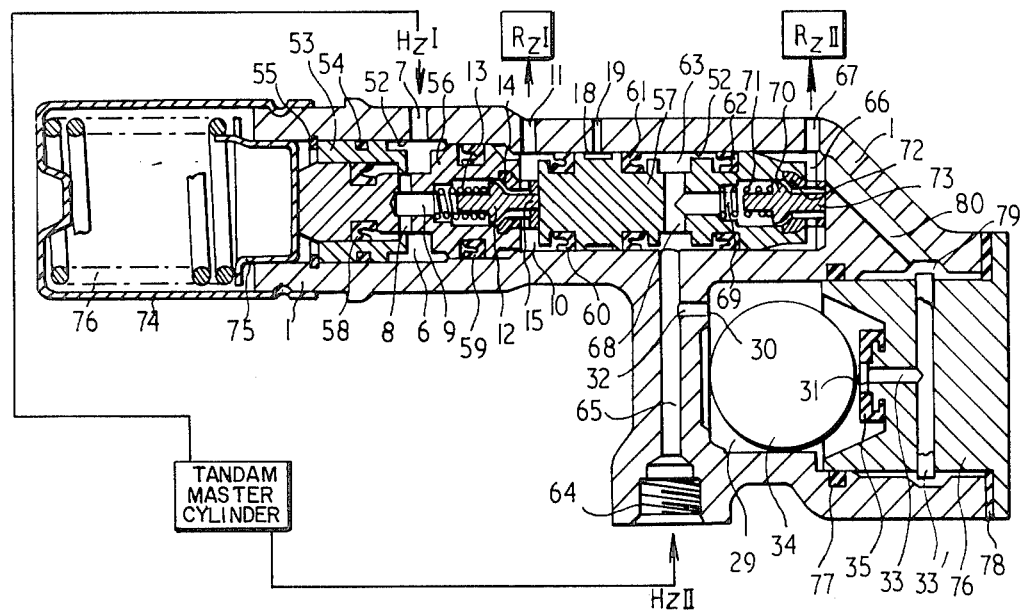
FIG. 3 is a longitudinal cross-sectional view of a third embodiment of a braking pressure control unit in accordance with the principles of the present invention which is controlled in response to load, deceleration and pressure.

FIG. 3 shows the third embodiment of a brake pressure control unit of the present invention in which a housing 1 including a bore 52 has a sleeve 53 inserted therein which is sealed relative to housing 1 by means of a sealing ring 54. A ring 55 fastened in housing 1 secures sleeve 53 against displacement. Sleeve 53 inserted in bore 52 forms a stepped bore accommodating a stepped piston 56. On the side adjacent the larger step of stepped piston 56, bore 52 accommodates a second piston 57 forming the partition wall. Stepped piston 56 is sealed relative to the bore of sleeve 53 by means of a seal 58, and relative to bore 52 by means of a seal 59. Terminating in a first inlet chamber 6, which is bounded by an annular surface of stepped piston 56, is a port 7 which connects with a first brake circuit Hz I of a master cylinder. First inlet chamber 6 is connected with a first outlet chamber 10 through a radial bore 8 and a coaxial fluid passageway 9 in the interior of stepped piston 56. The outlet chamber 10 is bounded by the front surface of the larger step of stepped piston 56 and is provided with a port 11 coupled to a wheel cylinder Rz I. Disposed in fluid passageway 9 is a valve closure member 12 which is urged against a valve seat 14 by a spring 13. Valve closure member 12 includes a tappet 15 extending out of stepped piston 56 and bearing upon a front end of second piston 57.

Second piston 57 is sealed relative to the bore wall by means of three seals 60, 61 and 62. Intermediate seals 61 and 62 is a second annular inlet chamber 63 into which a channel 65 leading to a port 64 terminates. Port 64 is connected with a second brake circuit Hz II of the master cylinder. The front end of piston 57 remote from stepped piston 56 forms a boundary of a second outlet chamber 66 including a port 67 coupled to a wheel cylinder Rz II. Second inlet chamber 63 is connected with second outlet chamber 66 through a radial bore 68 and a coaxial fluid passageway 69 in the interior of piston 57. Fluid passageway 69 accommodates a valve closure member 70 which is urged against a valve seat 72 by a spring 71. Valve closure member 70 includes a tappet 73 extending out of piston 57 and bearing upon a wall of housing 1.

Intermediate seals 60 and 61 of piston 57 is an annular chamber 18 which is pressurized by atmospheric pressure through a conduit 19. This measure serves to ensure that in the event of failure of any one of the two seals 60 or 61 the pressure is allowed to escape into atmosphere so that the failure may be noticed immediately.

Secured to the end of housing 1 accommodating stepped piston 56 is a spring cup 74 which houses a spring 76 inserted between the bottom of spring cup 74 and the spring plate 75. Spring plate 75 is in interaction with the smaller step of stepped piston 56.

Housing 1 includes a chamber 29 which is closed by means of a screw 76 and sealed relative to the outside by sealing rings 77 and 78. Chamber 29 provides a fluid inlet opening 30 and a fluid outlet opening 31. Fluid inlet opening 30 is connected to port 64 through a first conduit 32 and channel 65. Fluid outlet opening 31 is connected to an annular chamber 79 disposed in housing 1 through a second conduit 33 and 33'. Terminating in annular chamber 79 is a channel 80 emanating from second outlet chamber 66. Disposed in chamber 29 are a ball 34 and a sealing ring 35 which surrounds the fluid outlet opening and serves as the valve seat for ball 34.

The mode of operation of the braking pressure control unit of FIG. 3 shall first be described for the case where both brake circuits are operable. In the normal position of the arrangement, stepped piston 56 is urged against second piston 57 and the latter against the housing wall as a result of which closure members 12 and 70 of both valves are open. On actuation of the brake, the pressure fluid for both brake circuits is allowed to flow freely from port 7 to port 11 and from port 64 to port 67. At a specific pressure, stepped piston 56 moves in opposition to the preload of spring 76. Since at the same time the pressure in outlet chamber 66 would preponderate, second piston 57 initially follows stepped piston 56 until closure member 70 closes. If a specific vehicle deceleration is reached by that time, ball 34 rests against sealing ring 35, and fluid outlet opening 31 of chamber 29 is closed. Thus, when closure member 70 moves into abutment with valve seat 72, no further fluid is fed into outlet chamber 66, even if the pressure is increased on the inlet side. Second piston 57 stops moving and, with the pressure continuing to increase, stepped piston 56 continues moving against spring 76 and dissociates itself from second piston 57, thereby causing closing of closure member 12. A reduced pressure is then supplied to the brake cylinders through ports 11 and 67, respectively, with second piston 57 providing for equal pressures in outlet chamber 66 and outlet chamber 10.

However, in the event of the vehicle deceleration failing to reach the value at which ball 34 closes fluid outlet opening 31 the moment closure member 70 closes, pressure fluid continues being fed to outlet chamber 66 through first conduit 32, chamber 29 and second conduit 33, 33', 79, 80, thus causing a pressure increase in outlet chamber 66. Since second piston 57 provides for equal pressures in outlet chamber 10 and 66, closure member 12 remains open for the time being and will not close until after ball 34 closes fluid outlet opening 31 on attainment of a specific vehicle deceleration.

If the first brake circuit Hz I, Rz I fails as a result of a defect, the pressure increase in second outlet chamber 66 causes a displacement of second piston 57 as a result of which stepped piston 56 is urged against spring 76. In that case, the closing travel for the valve (closure member 70 and seat 72) disposed in piston 57 will be reached at a pressure which would be far too low to achieve a sufficient braking effect. Since the valve 70, 72 associated with second piston 57 functions as a pressure-limiting valve in the event of failure of the first brake circuit, this valve cannot be used for the further supply of pressure fluid. Through by-pass conduits 29, 32, 33, 33', 79, 80 which by-pass the valve 70, 72, pressure fluid continues being fed into outlet chamber 66 until ball 34 closes fluid outlet opening 31 at a specific vehicle deceleration.

Conversely, if the second brake circuit Hz II, Rz II fails, the mode of operation of stepped piston 56 as a pressure-reducing valve remains unchanged. However, the change-over point of the valve (closure member 12 and seat 14) will be reached at an earlier point of time than would be the case if both brake circuits were operable, because stepped piston 56 is only required to be displaced by the amount of the closing travel of its associated valve, in order to close that valve.

While we have described above the principles of our invention in connection with specific apparatus it is to be clearly understood that this description is made only by way of example and not as a limitation to the scope of our invention as set forth in the objects thereof and in the accompanying claims.

We claim:

1. A braking pressure control unit for a vehicle hydraulic brake system having two separate brake circuits to control brakes at the rear wheels of said vehicle comprising:
   a housing;
   a first inlet chamber disposed in said housing coupled to a first fluid pressure source;
   a second inlet chamber disposed in said housing spaced longitudinally from said first inlet chamber coupled to a second fluid source;

a first outlet chamber disposed in said housing spaced from said first and second inlet chambers connected to one of said two brake circuits;
a second outlet chamber disposed in said housing spaced from said first and second inlet chambers and said first outlet chamber connected to the other of said two brake circuits;
a first valve disposed in said housing between said first inlet chamber and said first outlet chamber;
a second valve disposed in said housing between said second inlet chamber and said second outlet chamber;
a movable partition wall disposed in said housing intermediate said first and second outlet chambers controlling said first and second valves;
a by-pass conduit disposed in said housing by-passing one of said first and second valves; and
a deceleration-responsive valve disposed in said by-pass conduit.

2. A control unit according to claim 1, wherein
said first valve is disposed in a stepped piston sealed to a bore in said housing intermediate said first inlet chamber and said first outlet chamber, and
said by-pass conduit by-passes said second valve.

3. A control unit according to claim 2, wherein
said second valve is disposed in said partition wall.

4. A control unit according to claim 3, wherein
said second valve includes
a closure member bearing upon a transverse wall of said housing by means of a tappet.

5. A control unit according to claim 1, wherein
one of said first and second valves is disposed in said partition wall.

6. A control unit according to claim 5, wherein
said one of said first and second valves includes
a closure member bearing upon a transverse wall of said housing by means of a tappet.

7. A control unit according to claim 1, wherein
said first and second valves are pressure-limiting valves.

8. A control unit according to claim 7, wherein
said partition wall includes
two pistons sealed to a bore of said housing intermediate said first and second valves, and
a spring disposed between said two pistons.

9. A control unit according to claim 1, wherein
said first and second valves and said partition wall are disposed in a bore of said housing coaxial of a longitudinal axis of said bore.

10. A control unit according to claim 1, wherein
said by-pass conduit includes
a chamber disposed in said housing, said chamber having a fluid inlet opening and a fluid outlet opening,
a first conduit connected between said fluid inlet opening and one of said first and second inlet chambers, and
a second conduit connected between said fluid outlet opening and one of said first and second outlet chambers.

11. A control unit according to claim 10, wherein
said deceleration-responsive valve includes
a sealing ring disposed around said outlet opening in said chamber to provide a valve seat, and
a ball disposed in said chamber to close said valve seat when a predetermined vehicle deceleration is exceeded.

12. A control unit according to claim 1, wherein
said first valve is disposed in a piston sealed to a bore in said housing, said piston being acted upon by a control spring, and
said by-pass conduit by-passes said second valve.

13. A control unit according to claim 12, wherein
said second valve is disposed in said partition wall.

* * * * *